US010307633B2

(12) United States Patent
Towley (10) Patent No.: US 10,307,633 B2
(45) Date of Patent: Jun. 4, 2019

(54) EXERCISE DEVICE HAVING SLED OR WHEELBARROW CONFIGURATION (71) Applicant: PowerBlock Holdings, Inc., Owatonna, MN (US)

(72) Inventor: Mattson K. Towley, Owatonna, MN (US)

(73) Assignee: PowerBlock Holdings, Inc., Owatonna, MN (US)

( * ) Notice: Subject to any disclaimer, the term of this patent is extended or adjusted under 35 U.S.C. 154(b) by 0 days.

(21) Appl. No.: 15/467,338

(22) Filed: Mar. 23, 2017

(65) Prior Publication Data
US 2017/0296858 A1 Oct. 19, 2017

Related U.S. Application Data (63) Continuation of application No. 14/736,694, filed on Jun. 11, 2015, now Pat. No. 9,636,537.

(51) Int. Cl.
A63B 21/00 (2006.01)
A63B 22/00 (2006.01)
A63B 22/20 (2006.01)
A63B 21/06 (2006.01)
A63B 21/072 (2006.01)
(Continued)

(52) U.S. Cl.
CPC .......... A63B 21/06 (2013.01); A63B 21/0004 (2013.01); A63B 21/00069 (2013.01); A63B 21/0618 (2013.01); A63B 21/0726 (2013.01); A63B 21/22 (2013.01); A63B 21/4035 (2015.10); A63B 21/4043 (2015.10); A63B 22/20 (2013.01); A63B 23/03575 (2013.01); A63B 23/047 (2013.01); B62B 1/18 (2013.01); A63B 21/00061 (2013.01); A63B 21/00065 (2013.01); A63B 21/00072 (2013.01); A63B 21/0615 (2013.01); A63B 21/0724 (2013.01); A63B 21/16 (2013.01); A63B 21/4005 (2015.10); A63B 23/03516 (2013.01); A63B 23/04 (2013.01); A63B 23/12 (2013.01);
(Continued)

(58) Field of Classification Search
None
See application file for complete search history.

(56) References Cited

U.S. PATENT DOCUMENTS 1,603,521 A * 10/1926 Davidson ................ G01L 5/13
73/379.01
2,973,203 A * 2/1961 Taylor ................ A63B 21/0602
280/29

(Continued)

Primary Examiner — John E Simms, Jr.
(74) Attorney, Agent, or Firm — James W. Miller (57) ABSTRACT An exercise device having a sled or wheelbarrow configuration comprises a frame that is pushed across a support surface by a user. The frame carries a wheel that movably supports the frame in the wheelbarrow configuration and at least one skid that movably supports the frame in the skid configuration. A pair of handles is selectively repositionable on the frame from a vertical orientation used in the sled configuration and a horizontal orientation used in the wheelbarrow configuration to quickly and easily convert the device between its different configurations. The frame has a carriage that supports a plurality of exercise weight members with the carriage being movable in a fore-and-aft direction on the frame for changing the effort required from the user to push the frame.

10 Claims, 6 Drawing Sheets (51) Int. Cl.
  *A63B 21/22* (2006.01)
  *A63B 23/035* (2006.01)
  *A63B 23/04* (2006.01)
  *B62B 1/18* (2006.01)
  *A63B 21/16* (2006.01)
  *A63B 23/12* (2006.01)

(52) U.S. Cl.
  CPC ... *A63B 2208/0204* (2013.01); *A63B 2225/09* (2013.01); *A63B 2225/093* (2013.01)

(56) References Cited

U.S. PATENT DOCUMENTS

| | | | | |
|---|---|---|---|---|
| 3,306,016 A * | 2/1967 | Murphy | ............ | A01D 34/6806 56/10.8 |
| 3,967,496 A * | 7/1976 | Luedtke | ............ | G01L 5/13 73/862.03 |
| 4,571,211 A * | 2/1986 | Kuna | ............ | A63H 17/05 446/434 |
| 4,615,223 A * | 10/1986 | Nause | ............ | G01L 5/13 446/434 |
| 6,041,584 A * | 3/2000 | Hohnl | ............ | A01D 34/74 280/43 |
| 6,439,954 B1 * | 8/2002 | Walter | ............ | A63H 17/05 446/434 |
| 2007/0232461 A1 * | 10/2007 | Jenkins | ............ | A63B 21/0552 482/93 |
| 2011/0124443 A1 * | 5/2011 | Krause | ............ | A63B 21/0618 473/445 |
| 2013/0012364 A1 * | 1/2013 | Leath | ............ | A63B 21/012 482/66 |
| 2013/0095984 A1 * | 4/2013 | Agate | ............ | A63B 21/0618 482/106 |
| 2014/0073491 A1 * | 3/2014 | Gilson | ............ | A63B 21/06 482/93 |
| 2015/0084291 A1 * | 3/2015 | Yoder | ............ | B62B 19/00 280/8 |

* cited by examiner

EXERCISE DEVICE HAVING SLED OR WHEELBARROW CONFIGURATION

TECHNICAL FIELD

This invention relates generally to exercise equipment and, more particularly, to sled and wheelbarrow type devices that are manually moved by a user over a substantially horizontal support surface, such as the ground or a floor, to thereby build strength.

BACKGROUND OF THE INVENTION

Exercise devices are known, often popularly called "sleds", which comprise a ground engaging frame that the user moves over a substantially horizontal support surface, such as the ground or a floor, to build leg and upper body strength. In many cases, such a sled includes handles which the user, who is standing behind the sled, grips and pushes forwardly against to push the sled over the support surface in a generally forward direction of motion. In other cases, the sled includes some type of harness which the user, who is now standing ahead of the sled, wears to pull or drag the sled behind the user in a generally forward direction of motion as the user moves forwardly. In most cases, the frame includes means for adjusting the total weight thereof to increase or decrease the effort required from the user to move the frame over the support surface. The effort required is greater when the total weight of the frame is increased and is lesser when the total weight of the frame is decreased. U.S. Pat. Nos. 7,727,089 and 7,955,223 to Gilman are typical examples of push type exercise sleds.

Most exercise sleds, including those referenced above and issued to Gilman, adjust the total weight of the sled by having some type of vertically extending peg or pin on which a plurality of conventional barbell type weight plates can be stacked. Thus, the total weight of the sled varies depending upon how many weight plates it carries. The total weight of the sled is obviously higher when the sled carries more weight plates and is lower when the sled carries fewer weight plates. To allow the total weight of the sled to vary over a relatively large range, the peg or pin carrying the weight plates has to be long enough to accommodate a large number of weight plates, or multiple pegs or pins have to be provided on the frame, or each of the weight plates has to be relatively heavy, or some combination of the above.

While this is a workable way of varying the total weight of the sled, it has a number of disadvantages. For one thing, if heavy weight plates, such as 45 pound weight plates are used, then the total weight of the sled can be adjusted in only relatively large, e.g. 45 pound, increments, with adjustments in between not being possible. If smaller weight plates are used, many more of these weight plates have to be on hand and accessible for stacking to get to a total weight that is large enough. In addition, the frame of the sled must be provided with many more pegs or pins for carrying such weight plates.

In addition, if a user selects a very heavy total weight for the sled and then moves the sled a considerable distance over the support surface, the user might decide that the same very heavy total weight is now too much for the user to move over the return trip back to the starting point due to the effort the user expended in the first half of the trip. The only way to lessen the total weight of the sled in this eventuality is for the user to offload some of the weight plates before moving the sled back to the starting point. Unfortunately, this leaves the offloaded weight plates at some distance away from the starting point and requires the user to subsequently go and retrieve them. Accordingly, a way of easily adjusting the effort required by the user to move the sled that would avoid these disadvantages would be an advance in the art.

Other exercise devices that are somewhat related to the sleds described above are wheelbarrow type devices which comprise a frame that incorporates a ground engaging wheel at one end of the frame. Such exercise wheelbarrows lack the typical material carrying bucket or hopper found on the types of wheelbarrows found in lawn and garden stores. Instead, the frame of the exercise wheelbarrow carries the types of pegs or pins typically found on exercise sleds for being able to load a selected number of weight plates onto the exercise wheelbarrow to adjust the total weight thereof.

The exercise wheelbarrow typically has two rearwardly extending, laterally spaced, elongated handles on the end of the frame opposite to the end of the frame that carries the wheel. The user grips these handles towards the outer end thereof, lifts up on the handles to lift the total weight of wheelbarrow up off the ground and place such weight on the ground engaging wheel, and then pushes forwardly on the handles in the manner of a typical wheelbarrow to roll the exercise wheelbarrow forwardly on its wheel. The effort required from the user to do this is a function of how many weight plates are stacked on the pegs or pins carried on the frame of the wheelbarrow and where such pegs or pins are placed on that frame. U.S. Pat. No. 8,858,405 to Agate shows an exercise wheelbarrow of this type.

To the extent that exercise wheelbarrows simply use pegs or pins for carrying a selected number of stacked weight plates in order to adjust the total weight of the wheelbarrow, exercise wheelbarrows suffer the same weight adjustment disadvantages as their exercise sled brethren. Thus, a way of easily adjusting the effort required by the user to move an exercise wheelbarrow without suffering from these same disadvantages would also be an advance in the art.

Finally, exercise sleds and exercise wheelbarrows are typically built and sold as entirely separate devices. A user wishing to have both devices on hand for use in exercising would have to buy both devices separately, namely both a sled as well as a separate wheelbarrow. The Agate patent referenced above discloses a single device that is convertible between sled and wheelbarrow configurations.

However, the manner of construction of the Agate device and the nature of the conversion is unduly complicated and somewhat cumbersome. For example, separate handle styles having separate parts need to be used in the Agate device depending upon whether one is in the sled or in the wheelbarrow configuration. These separate handles are prone to being lost on unavailable when needed. In addition, the Agate device uses the traditional peg or pin/stacked weight plate method of total weight adjustment and thus suffers from the weight adjustment disadvantages discussed above.

SUMMARY OF THE INVENTION

One aspect of this invention relates to an exercise device which comprises a frame having a support surface engaging portion that permits the frame to move forwardly over the support surface as a user pushes the frame forwardly using at least one pair of handles provided on the frame. A carriage is provided on the frame configured to support at least one exercise weight member thereon for adding mass to the frame. The carriage is selectively movable on the frame by the user into different fore-and-aft positions on the frame to vary the resistance to pushing that the user must overcome in order for the user to push the frame forwardly. The carriage and the frame have a cooperable lock disposed therebetween for retaining the carriage in one of the positions selected by the user.

Another aspect of this invention relates to an exercise device which comprises a frame having a front end and a rear end. Two laterally spaced handles are carried on the frame adjacent the rear end of the frame. The handles are selectively repositionable by a user on the frame from a first generally horizontal orientation to a second generally vertical orientation and vice versa. At least one support surface engaging wheel is carried on the frame adjacent the front end of the frame with the at least one wheel being rotatable about a substantially horizontal axis of rotation to permit rolling the frame over a support surface. At least one support surface engaging, fore-and-aft extending skid is provided on the frame. At least one exercise weight member is carried on the frame for adding mass to the frame. The at least one skid is positioned relative to the at least one wheel such that the at least one skid is lifted up out of contact with the support surface while the at least one wheel remains in contact with the support surface when the handles are positioned in their first generally horizontal orientation and a user grips the handles and elevates the rear end of the frame by lifting up on the handles to incline the frame downwardly towards the front end of the frame in the manner of a wheelbarrow such that the user is thereafter able to push forwardly on the handles to roll the frame forwardly over the support surface in the manner of a wheelbarrow. In addition, the at least one skid remains in contact with the support surface when the handles are positioned in their second generally vertical orientation such the user is thereafter able to push forwardly on the handles to slide the frame forwardly over the support surface in the manner of a sled. The frame may be quickly and easily converted from use in the wheelbarrow manner to use in the sled manner and vice versa depending upon whether the user has installed the handles in their first generally horizontal orientation on the frame or in their second generally vertical orientation on the frame, respectively.

BRIEF DESCRIPTION OF THE DRAWINGS

This invention will be described more fully in the following Detailed Description, when taken in conjunction with the following drawings, in which like reference numerals refer to like elements throughout.

DETAILED DESCRIPTION

Figure 1:
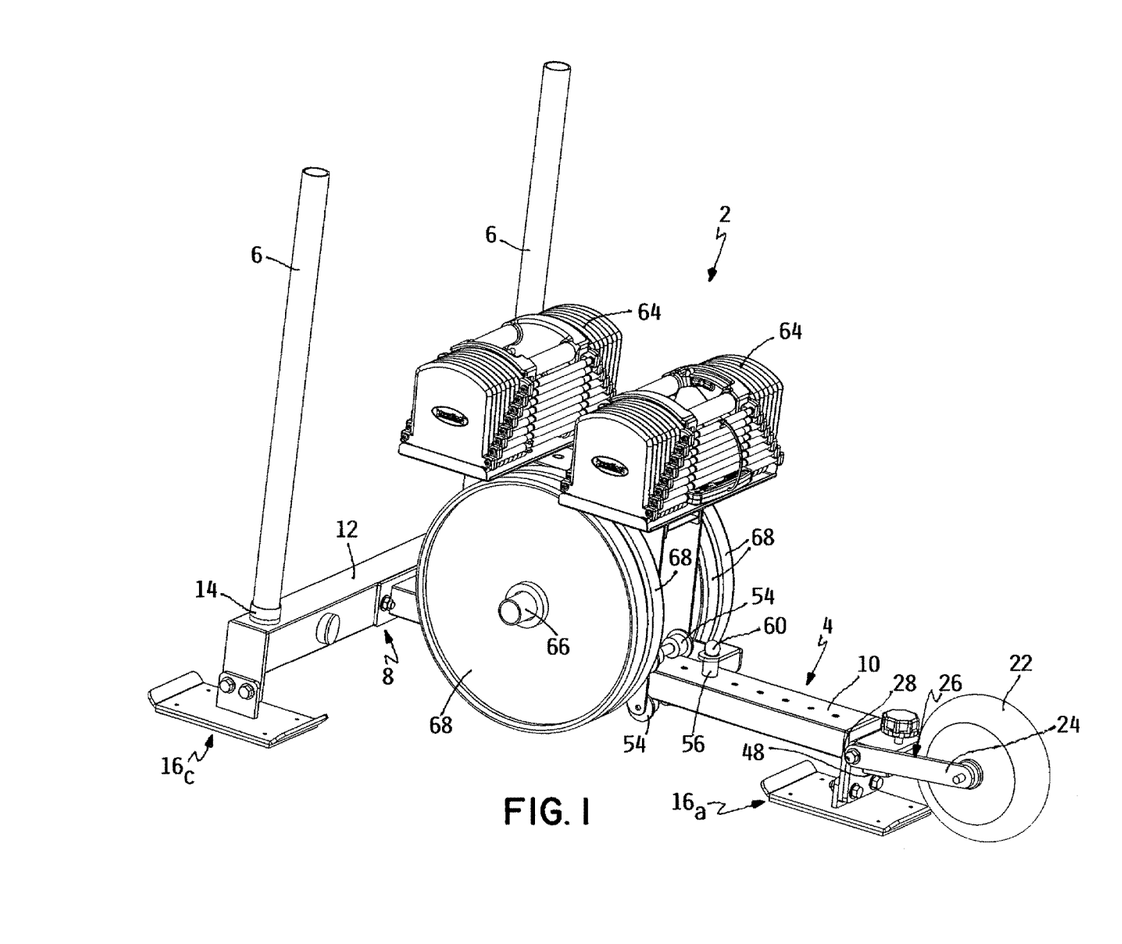
FIG. 1 is a perspective view of a first embodiment of an exercise device according to this invention, particularly illustrating the device in its sled configuration.
Figure 2:
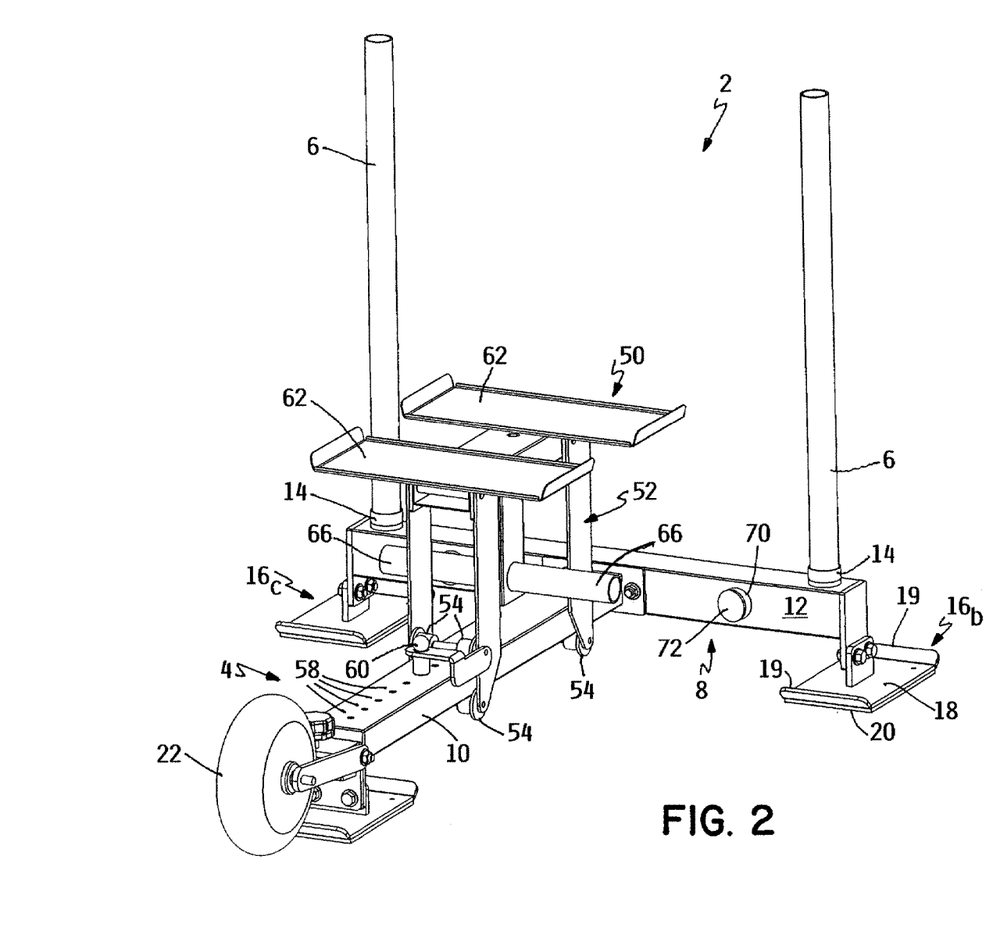
FIG. 2 is a perspective view similar to FIG. 1 but showing the opposite side of the exercise device of FIG. 1, with FIG. 2 also particularly illustrating the device with the add-on exercise weights having been removed from the device to illustrate the movable weight carrying carriage of the device.
Figure 3:
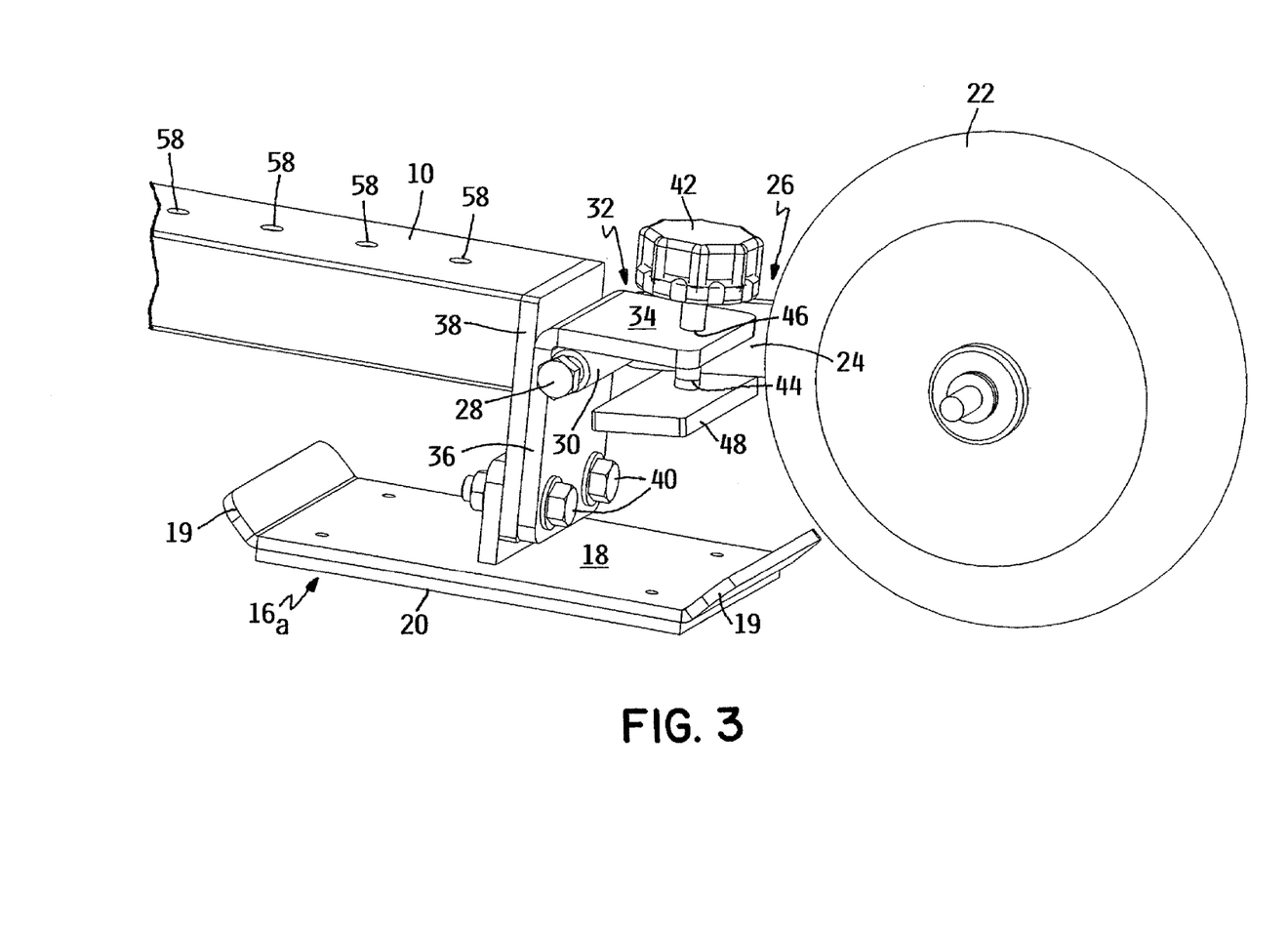
FIG. 3 is a perspective view of the front end of the exercise device of FIG. 1, particularly illustrating details of the wheel adjustment used for changing the vertical position of the support surface engaging wheel relative to the frame of the device.
Figure 4:
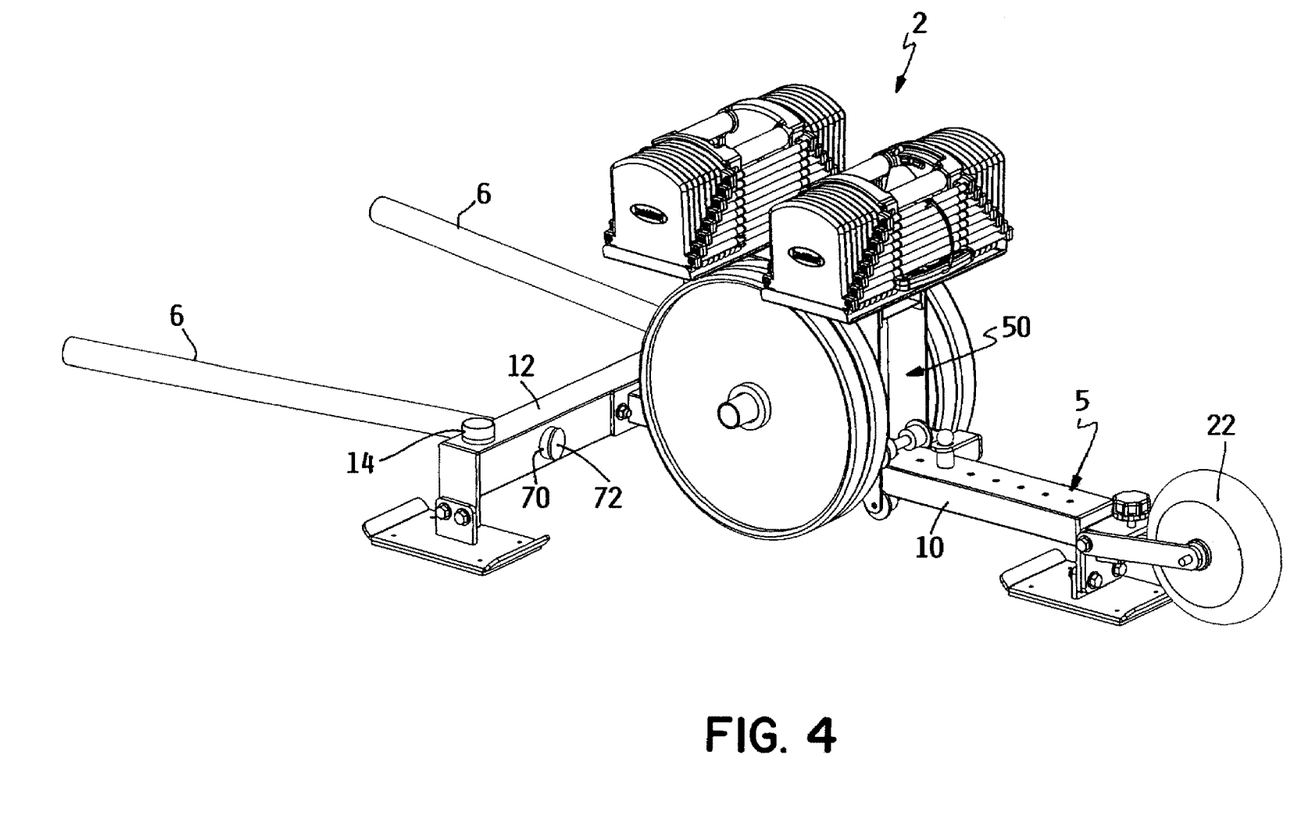
FIG. 4 is a perspective view of the exercise device of FIG. 1 after such device has been converted into its wheelbarrow configuration.

A first embodiment of an exercise device according to this invention is illustrated in the drawings generally as 2. FIGS. 1-3 depict device 2 set up for use as an exercise sled 4. Device 2 includes a pair of laterally spaced handles 6 that can be gripped by a user when device 2 is being used by the user for exercising. Handles 6 can be quickly and easily repositioned from a substantially vertical orientation to a substantially horizontal orientation to convert device 2 from sled 4 to an exercise wheelbarrow 5 without the need for any additional parts or separate specially shaped handle assemblies. FIG. 4 depicts device 2 after device 2 has been converted into wheelbarrow 5.

Device 2 includes a T-shaped frame 8 having a fore-and-aft extending, hollow, tubular rail 10. Rail 10 is fixed at one end to a hollow, tubular cross member 12 that extends laterally beyond either side of rail 10 to form the T-shape. Frame 8 is oriented generally horizontally with rail 10 and cross member 12 being contained in a common plane. An open, upwardly facing, handle receiving mount in the nature of a socket 14 is provided on the top surface of cross member 12 adjacent each end of cross member 12.

As best shown in FIG. 2, a plurality of downwardly extending, support surface engaging skids 16 are rigidly fixed to frame 8. The support surface can be any surface, either a natural surface such as the ground or a turf surface or an artificial surface such as a floor or a paved surface, which is able to support device 2 for movement of device 2 over the support surface. A first skid $16_a$ is provided adjacent the front end of rail 10. Second and third skids $16_b$, $16_c$ are respectively provided adjacent the left and right ends of cross member 12. Each skid 16 preferably comprises a flat, rectangular plate 18 with upturned front and rear edges 19 resembling ski tips. The underside of flat plate 18 of each skid 16 preferably includes a friction increasing member 20 of some type, such as a smooth or knurled rubber pad. Member 20 is removably attached by fasteners to flat plate 18 of each skid 16 to allow easy replacement with a new member 20 when the member 20 currently in use has become worn.

A support surface engaging wheel 22 is rotatably journalled between the laterally spaced arms 24 of a pivotal yoke 26 that is carried on the front end of rail 10 of frame 8. The rear ends of arms 24 of yoke 26 are pivotally journalled on a bolt 28, which is best shown in FIG. 3, which serves as a pivot for yoke 26. Bolt 28 is supported within a bushing 30 located on the underside of an L-shaped mounting bracket 32 at the junction between the horizontal top and vertical rear walls 34, 36 of bracket 32. Rear wall 36 of bracket 32 is affixed by a plate 38 to the front end of rail 10 by the same attachment bolts 40 that secure first skid $16_a$ to plate 38. See FIG. 3.

Referring further to FIG. 3, a rotatable adjustment knob 42 has a threaded, downwardly extending shank 44. Shank 44 is threadedly received in a threaded aperture 46 in top wall 34 of bracket 32. Arms 24 of yoke 26 are joined together by a bottom cross plate 48. Shank 44 is positioned generally in alignment with and below shank 44 of knob 42 so that the bottom of shank 44 always contacts the top of cross plate 48. This is due to the fact that wheel 22 carried on yoke 26 always rests on the support surface which engagement will rotate yoke 26 upwardly about the pivot axis formed by bolt 28 to keep cross plate 48 engaged with the bottom of shank 44.

When knob 42 is rotated by a user to move shank 44 in a downward direction, the engagement of the bottom of shank 44 against cross plate 48 of yoke 26 forces the front end of rail 10 and first skid 16$_a$ to jackknife or lift upwardly relative to yoke 26 and wheel 22 and thus relative to the ground or floor. In this situation, yoke 26 and wheel 22 are, in effect, being forced downwardly relative to the front end of rail 10 and first skid 16$_a$ to progressively take some of the weight off the front end of rail 10 and first skid 16$_a$ dependent upon how far up the bottom of shank 44 is raised by rotation of knob 42. Conversely, when knob 42 is rotated in the reverse direction by a user to move shank 44 in an upward direction, the jackknife action will reverse with the front end of rail 10 and first skid 16$_a$ lowering back down towards the ground to reabsorb increasing amounts of weight depending upon the amount of the reverse rotation of knob 42. Thus, knob 42 and the engagement of shank 44 of knob 42 with cross plate 48 of wheel 22 is an adjustment device that allows the weight of frame 8 at the front of rail 10 to be carried substantially entirely by first skid 16$_a$, or substantially entirely by wheel 22, or at any desired ratio between first skid 16$_a$ and wheel 22, as determined by the vertical position of the bottom of shank 44. This adjustment allows the pushing resistance offered by sled 4 to be varied according to the preference of the user.

Referring now to FIG. 2, a carriage 50 is provided on rail 10 of device 2 between the front end of rail 10 and cross member 12. Carriage 50 comprises a generally box-shaped carriage frame 52 that is capable of supporting one or more exercise weight members for adding mass to device 2. Top and bottom pairs of flanged rollers 54 are rotatably carried on each of the front and rear ends of carriage frame 52. The top and bottom pairs of rollers 54 at the front and rear ends of carriage frame 52 grip and roll along the top and bottom sides of rail 10 to support carriage 50 for rolling motion along a substantial portion of the length of rail 10.

As shown in FIGS. 1 and 2, carriage 50 is disposed on rail 10 in one of its most rearward positions in which carriage 50 is relatively close to cross member 12. However, rollers 54 would allow carriage 50 to be rolled towards the front of rail 10 to vary the fore-and-aft distance between carriage 50 and wheel 22. This forward motion decreases the lever arm between the additional weight or mass borne by carriage 50 and wheel 22 to decrease the force required to lift and push device 2 when device 2 is configured as wheelbarrow 5. Rearward motion of carriage 50 obviously increases the lever arm to thereby increase the lifting and pushing force required to move wheelbarrow 5.

Carriage 50 can be locked in a desired fore-and-aft position along rail 10 using a cooperable lock having a first portion provided on carriage 50 and a second portion provided on rail 10 of frame 8. The lock comprises a spring biased pop pin 56 on carriage frame 52 that is selectively engaged with one of a plurality of spaced locking holes 58 along the length of rail 10. Pop pin 56 has an enlarged head 60 to allow the user to pull up on pop pin 56 against the bias of a spring (not shown) to disengage or release the locking action provided by pop pin 56. With pop pin 56 so released, the user can roll carriage 50 fore-and-aft along rail 10 until pop pin 56 is centered above another locking hole 58. The user then releases head 60 of pop pin 56 to allow the spring force to reengage or reset pop pin 56 into the newly selected locking hole 58 to relock carriage 50 in its newly selected position along the length of rail 10. While use of a lock which is released and reset by the user is preferred, the lock could alternatively comprise either a friction type lock which is continuously engaged but with the friction being capable of being overcome by the user pushing against carriage 50 to move carriage 50 into another position along rail 10 or a lock that is provided by the holding force of the screw threads on a threaded rod that must be turned or cranked by the user to move carriage 50 along rail 10.

Referring again to FIG. 2, carriage 50 includes a pair of upwardly facing trays 62 at the top thereof which are configured for supporting a first type of exercise weight member, namely a pair of selectorized dumbbells 64 known as PowerBlocks® manufactured and sold by PowerBlock, Inc. of Owatonna, Minn. Dumbbell 64 is disclosed more fully in U.S. Pat. Nos. 5,637,064 and 7,775,947, which are hereby incorporated by reference. Trays 62 are spaced apart in a fore-and-aft direction such that there is a front tray and a rear tray. In addition, trays 62 extend laterally relative to rail 10 such that dumbbells 64 supported on trays 62 are also laterally disposed with the axis of the handle of each dumbbell 64 extending perpendicularly to rail 10. Trays 62 are preferably centered atop carriage frame 52 so that the weight or mass provided thereby is centered on carriage 50 both in fore-an-aft and lateral directions.

In addition, carriage 50 includes pins 66 that extend laterally outwardly from opposite sides of carriage frame 52. Pins 66 are centered on carriage frame 52 between trays 62 at a vertical location below that of trays 62 with pins 66 extending outwardly beyond the corresponding sides of rail 10. A second type of exercise weight member comprising a plurality of barbell type weight plates 68 can be mounted to either side of carriage frame 52 by slipping the center holes in each weight plate 68 onto one pin 66. Pins 66 are desirably long enough to allow a plurality of such weight plates 68 to be slipped onto each pin 66. When weight plates 68 are loaded onto pins 66, weight plates 66, which may be as large as standard 45 lb. barbell weight plates, will extend downwardly past the sides of rails 10 but will not extend so far down as to touch the support surface on which device 2 is supported.

FIG. 1 demonstrates one way in which carriage 50 can be loaded with additional weight. Two relatively large weight plates 68 (e.g. standard 45 lb. barbell weight plates) are capable of being slipped onto each pin 66. These weight plates 68 collectively provide 180 lbs. of weight. Obviously, smaller barbell weight plates 68 could be received on pins 66 as well with each pin 66 possibly accommodating more than two such weight plates 68 as the weight plates get smaller. In addition, one or both of trays 62 of carriage 50 can carry dumbbell 64.

FIG. 1 shows two fully loaded dumbbells 64 carried on trays 62 in addition to the four 45 lb. weight plates 68. Since a fully loaded dumbbell 64 can be as heavy as 125 pounds, using two fully loaded dumbbells 64 would allow the total weight placed on carriage 50 to be as much as approximately 430 pounds, namely the collective weight of weight plates 68 and the weight of dumbbells 64. However, in a selectorized dumbbell like dumbbell 64, a selector is provided which can be moved selectively by a user to "select" or couple different numbers of weights to the handle of dumbbell 64. Thus, the user has relatively fine control of the total weight placed onto carriage 50 by adjusting dumbbells 64 into any desired weight less than their maximum weight before they are placed onto trays 62. Obviously, further adjustment is possible by using only weight plates 68, or only dumbbells 64, or only one dumbbell 64, on carriage 50. Thus a wide range of weight can be placed onto carriage 50 at the preference of the user.

While use of rollers 54 on carriage 50 is preferred as a way of facilitating movement of carriage 50 along rail 10, such rollers 54 could be deleted in favor of a non-rotatable sliding interface of some type, such as a key/keyway interface. Thus, the term "carriage" as used herein is intended to cover any component or structure that supports something, namely the weight plates 68 and/or dumbbells 64, and that moves relative to frame 8 to shift the position of what is being supported thereon.

Finally, handles 6 received in sockets 14 adjacent the opposite ends of cross member 12 preferably comprise simple cylindrical pipes or tubes which are separate from one another. Sockets 14 have a circular shape with an internal diameter that is slightly larger than the outer diameter of handles 6. This allows the circular form of the lower ends of the pipes or tubes that form handles 6 to be easily and quickly slipped downwardly into sockets 14 in a telescopic fit without using a separate locking device to hold handles 6 in sockets 14. However, some type of handle locking device between the lower ends of handles 6 and sockets 14, e.g. a screw thread connection or a locking pin received in a through bore, could be optionally used if so desired.

The cross-sectional shape of handles 6 and sockets 14 could be other than cylindrical, e.g. square, as long as the shape permits a telescopic interconnection between the two. In addition, sockets 14 could comprise upwardly extending mounting posts with the open ends of handles 6 being somewhat larger so that the posts telescopically fit inside the open ends of handles 6. Thus, the mounts that connect handles 6 to frame 8 are preferably telescopic in nature for ease of use, but it is not important which member is the male member and which is the female member in such a telescopic interconnection.

The form of device 2 comprising sled 4 as shown in FIGS. 1 and 2 is obviously intended to be pushed by a user standing behind sled 4 who grips the upper end of each handle 6 and then pushes sled 4 over the support surface using leg and upper body strength. In doing this, the user can obviously place a desired amount of weight on carriage 50 to form the exercise weight that he or she must move by pushing sled 4. In addition, the user can adjust the position of wheel 22 using the rotatable knob 42 to vary the amount of the weight at the front of frame 8 that is carried by first skid $16_a$. When more weight is carried by wheel 22 and less by first skid $16_a$, sled 4 will be easier to push, and vice versa.

When device 2 is used as sled 4, the position of carriage 50 along rail 10 can also affect the force the user must apply to sled 4 to push sled 4 or affect how sled 4 behaves when being pushed. For example, in the situation where wheel 22 is adjusted upwardly into a non-weight bearing position and skids 16 are bearing the entire mass of sled 4, carriage 50 is preferably moved to a centered or even a somewhat rearward position on rail 10 so that the additional mass provided by carriage 50 and the exercise weight members carried thereon is not too far forward and too close to wheel 22. This is useful in avoiding the tendency of a forwardly positioned carriage 50 that is close to wheel 22 to cause sled 4 to pitch or overturn forwardly when sled 4 is being pushed forwardly by the user.

In addition, when wheel 22 is adjusted downwardly to take some of the mass of sled 4 off first skid $16_a$, and even into a position where first skid $16_a$ is lifted completely off the support surface such that sled 4 has only second and third skids $16_b$ and $16_c$ in contact with the support surface, then the position of carriage 50 along rail 10 can affect how much force the user must apply to sled 4 to push it forwardly. For example, if carriage 50 is moved rearwardly on rail 10 to at least partially overlie second and third skids $16_b$ and $16_c$, then the additional mass provided by carriage 50 and the exercise weight members carried thereon forces second and third skids $16_b$ and $16_c$ more firmly into engagement with the support surface making it harder for the user to push it forwardly over the support surface. If carriage 50 and the exercise weight members carried thereon are moved forwardly to be somewhat close to wheel 22 when wheel 22 is in at least a partial weight bearing engagement with the support surface, then sled 4 is markedly easier to push than when carriage 50 is more rearward. In this situation, since wheel 22 is in at least a partial weight bearing engagement with the support surface, wheel 22 helps sled avoid the pitching or overturning tendency that it might otherwise have with a forwardly positioned carriage.

Instead of pushing sled 4 forwardly using the substantially vertically oriented handles 6 as shown in FIGS. 1 and 2, a user may couple himself or herself to sled 4 using a body harness of some type (not shown) that is attached to some type of eyelet or anchor (not shown) on the front of frame 8. In this type of exercise, the user stands in front of sled 4 and leans forwardly and walks or runs forwardly to pull sled 4 behind the user. The upturned "ski tip" type front and rear edges 19 of skids 16 help skids 16 travel over the support surface without digging into the support surface whether sled 4 is being pushed from the rear via handles 6 or pulled from the front via the body harness.

Referring now to FIG. 4, device 2 in the form of sled 4 can be very quickly and easily converted into wheelbarrow 5 simply by repositioning handles 6. Handles 6 as used on sled 4 are first pulled upwardly out of sockets 14 located on the top of cross member 12 to disconnect handles 6 completely from cross member 12. Then, handles 6 are reconnected to cross member 12 into open, rearwardly facing, horizontal sockets 70 contained on a rear wall of cross member 12 with such horizontal sockets 70 passing through cross member 12 to terminate in capped front ends 72. Horizontal sockets 70 are laterally spaced apart from one another along the length of cross member 12 but by a distance which is slightly less than the distance of vertical sockets 14 used in sled 4. When one end of each handle 6 is pushed forwardly into the open rear end of each horizontal socket 70, the pair of handles 6 will be laterally spaced apart from one another and substantially horizontal or in the same plane as frame 8 of device 2 as shown in FIG. 4.

With handles 6 repositioned as shown in FIG. 4, device 2 can be used as wheelbarrow 5 by a user standing behind device 2. The user simply reaches down, grabs handles 6, lifts upwardly on handles 6 to elevate frame 8 using handles 6 until all of the skids 16 are lifted up off the ground and the weight of device 2 is borne by wheel 22, and then pushes forwardly on handles 6 to roll wheelbarrow 5 over the support surface in the manner of a typical wheelbarrow. The force required from the user to do this depends upon two factors.

The first factor is the total amount of weight placed on carriage 50 in the form of weight plates 68, dumbbells 64, or both. The second factor is the location of carriage 50 relative to wheel 22. If carriage 50 is moved forwardly towards wheel 22, the force required from the user for a given amount of weight carried by carriage 50 goes down. The converse is true if carriage 50 is moved further back on rail 10 away from wheel 22. Then, the force required from the user for the same given amount of weight carried by carriage 50 goes up.

The provision of carriage 50 and its movability along rail 10 coupled with the ability to change in rather large amounts the weight carried by carriage 50 itself provides the user with an ability to easily change the effective weight of wheelbarrow 5. This can be done quickly and easily for the most part by putting a total weight on carriage 50 that is in the moderate range for a particular user and then simply rolling carriage 50 back and forth along rail 10 to make this weight more or less effective for the user. There is no longer a need to have many different weight plates available and on hand or to continually change or adjust the weight by stacking or unstacking different numbers of weight plates on frame 8 of device 2. All the user has to do is load carriage 50 with a sufficient amount of weight and then roll carriage 50 back and forth as need be. This enhances the ease and use of wheelbarrow 5 by the user.

In addition, the ability to convert device 2 from sled 4 to wheelbarrow 5 in a quick and simple manner is advantageous. All the user has to do is slip handles 6 out of one set of sockets 14 and into the other set of sockets 70. The vertical sockets 14 are used for sled 4, the horizontal sockets 70 for wheelbarrow 5. There is no need for two sets of specially shaped handles in order to make the conversion or for two entirely separate exercise devices 2 with one being the sled and the other being the wheelbarrow.

Figure 5:
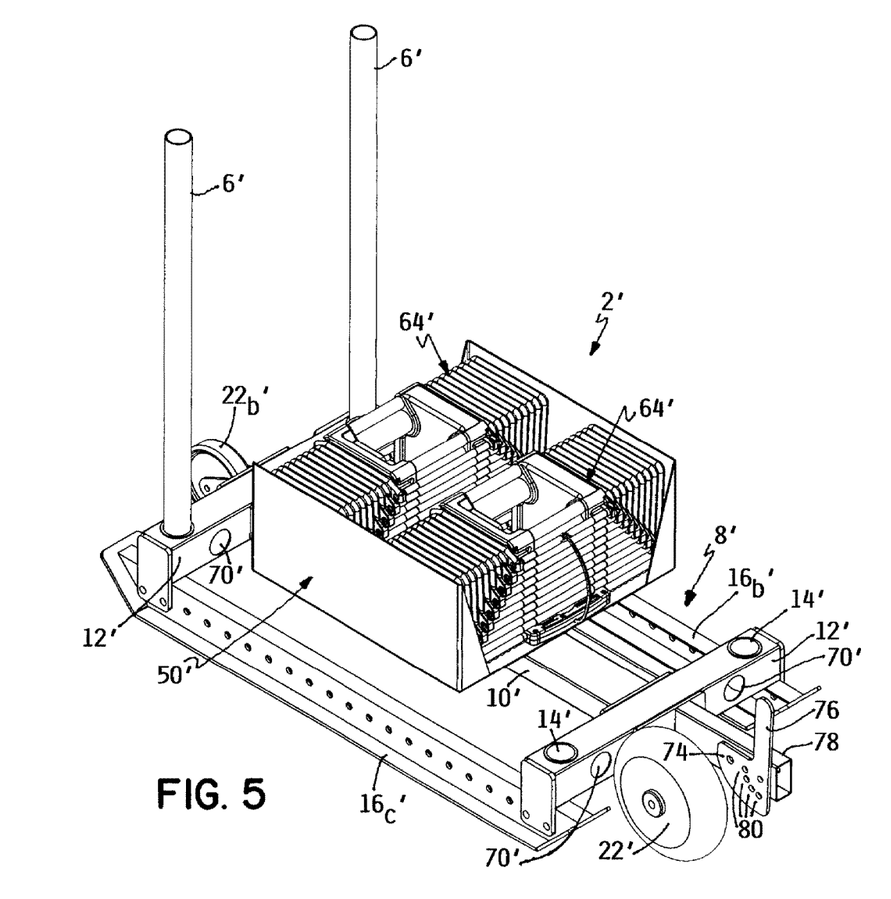
FIG. 5 is perspective view of a second embodiment of an exercise device according to this invention, particularly illustrating the device in its sled configuration and with the front wheel shown in an exploded form to better illustrate an alternative wheel height adjustment mechanism.
Figure 6:
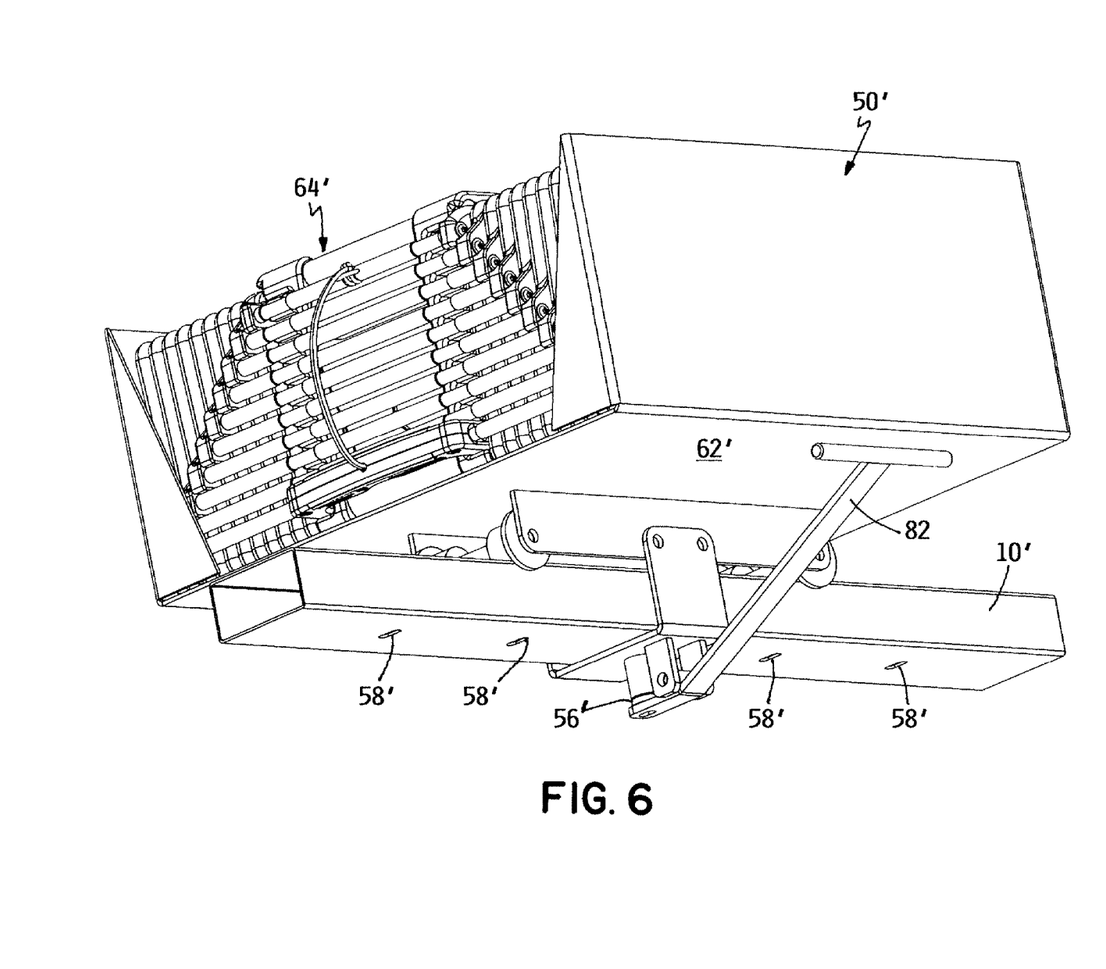
FIG. 6 is a perspective view of a portion of the exercise device of FIG. 6, particularly illustrating another form of the movable carriage that carries additional exercise weight members.

Referring now to FIGS. 5 and 6, a second embodiment of an exercise device according to this invention is illustrated generally as 2'. The same reference numerals used in FIGS. 1-4 to refer to components will be used in FIGS. 5 and 6 to refer to the same or corresponding components with a prime designation being used to refer to those components in the second embodiment, e.g. device 2' in FIGS. 5 and 6 as opposed to device 2 in FIGS. 1-4.

Frame 8' of device 2' is no longer T-shaped but has a rectangular box-like shape in which rail 10' extends between laterally extending front and rear cross members 12'. Instead of three skids arranged in a tripod configuration as in device 2, device 2' is provided with two much longer side skids $16_b$' and $16_c$' that are bolted to opposite ends of front and rear cross members 12'. Side skids $16_b$' and $16_c$' run substantially the entire fore-and-aft length of frame 8'.

Device 2' has a different wheel height adjustment mechanism for wheel 22'. As shown in FIG. 5, wheel 22' is rotatably journalled at hole 74 to a rotatable height adjustment lever 76 that is pivotally carried on a wheel mount 78 that extends forwardly from front cross member 12'. Lever 76 has a plurality of vertically spaced height adjustment holes 80 that will receive a laterally extending locking pin (not shown) on wheel mount 78. Lever 76 can be flexed or pivoted to the side to disengage the locking pin from whatever hole 80 it is currently received in, lever 76 can then be rotated to position another hole 80 adjacent the locking pin, and lever 76 can then be reset into its normal position such that the locking pin enters the newly selected hole 80. The height of wheel 22' relative to frame 8' is thus adjusted up or down depending upon which hole 80 is used to receive the locking pin. This type of wheel height adjustment mechanism which permits height adjustment in discrete increments is well known in the walk behind lawn mower art for adjusting the height of lawn mower wheels and need not be further described herein.

As further shown in FIGS. 5 and 6, carriage 50' is still movable along fore-and-aft along rail 10', but now includes only a single, large rectangular tray 62' that is open at the top for receiving therein two dumbbells 64'. Dumbbells 64' extend in a lateral direction relative to rail 10' with a dumbbells 64' being arranged in tandem in a fore-and-aft direction inside tray 62'. Thus, carriage 50' can be much more vertically compact than its counterpart 20 as it lacks any of the pins needed to support the barbell type weight plates. A releasable and resettable pop pin 56'/hole 58' lock is still used to retain carriage 50' in a desired adjusted position along rail 10', but this time such lock is positioned along the bottom of rail 10' rather than the top of rail 10'. A pivotal lever type handle 82 extends out from beneath rail 10' to the side of carriage 50' to allow the user to manipulate pop pin 56' from the side without having to get down on his or her knees and reach beneath rail 10'. See FIG. 6.

Finally, each of the front and rear cross members 12' carries both pairs of vertical sockets 14' and horizontal sockets 70' for reception of handles 6' and a second wheel $22_b$' is carried at the rear end of frame 8' on rear cross members 12'. Second wheel $22_b$' may be a different size than wheel 22' and may lack any height adjustability. Alternatively, second wheel $22_b$' may be exactly the same as wheel 22' and may be provided with height adjustability in the same manner as wheel 22', effectively being a duplicate of wheel 22' on the rear end of frame 8'.

The duplication of sockets 14' and 70' on both ends of frame 8' along with wheels 22' and $22_b$' on both ends of frame 8' means that a user when exercising would not necessarily have to turn frame 8' around in order to go back in the direction that he or she just came from. This would be useful if device 2' is being used in tight or restricted spaces. After making a first pass in one direction and coming to the end of the pass, the user could simply remount handles 6' in one set of sockets 14' or 70' at the opposite end of frame 6 to then begin pushing frame 8' back in the opposite direction to that which it was traveling in the first pass. This avoids having to muscle frame 8' around in order to go back in the direction from which it has just come.

Various modifications of this invention will be apparent to those skilled in the art. For example, device 2, 2' is most economically sold and used with only a single pair of handles 6, 6'. This enables the user to switch handles 6, 6' from one set of sockets to the other set of sockets 14', 70' to quickly and easily convert between the sled and wheelbarrow configurations of device 2, 2'. However, rather than requiring such a conversion, it would be possible for a user to purchase at least two pairs of handles 6, 6' rather than a single pair of handles so that the user would install one pair of handles 6, 6' in the vertical sockets 14, 14' and the second pair of handles 6, 6' in the horizontal sockets 70, 70' and leave them permanently in place. While not as economic as having to purchase only a single pair of handles, some users might prefer having two pairs of handles and simply leaving them in place in order to use the sled or wheelbarrow configurations of the device without having to reposition the handles. Thus, the scope of this invention is to be limited only by the appended claims.

The invention claimed is:

1. An exercise device, which comprises:
   (a) a frame having a front end and a rear end;
   (b) two laterally spaced handles carried on the frame adjacent the rear end of the frame, wherein the handles are selectively repositionable by a user on the frame from a first generally horizontal orientation to a second generally vertical orientation and vice versa;
   (c) at least one support surface engaging wheel carried on the frame adjacent the front end of the frame with the at least one wheel being rotatable about a substantially horizontal axis of rotation to permit rolling the frame over a support surface;

(d) at least one support surface engaging, fore-and-aft extending skid on the frame;

(e) at least one exercise weight member carried on the frame for adding mass to the frame, wherein the at least one exercise weight member is supported on a carriage that is movable in a fore-and-aft direction on the frame towards and away from the at least one front wheel;

(f) wherein the at least one skid is positioned relative to the at least one wheel such that the at least one skid is lifted up out of contact with the support surface while the at least one wheel remains in contact with the support surface when the handles are positioned in their first generally horizontal orientation and a user grips the handles and elevates the rear end of the frame by lifting up on the handles to incline the frame downwardly towards the front end of the frame in the manner of a wheelbarrow such that the user is thereafter able to push forwardly on the handles to roll the frame forwardly over the support surface in the manner of a wheelbarrow;

(g) wherein the at least one skid remains in contact with the support surface when the handles are positioned in their second generally vertical orientation such the user is thereafter able to push forwardly on the handles to slide the frame forwardly over the support surface in the manner of a sled, whereby the frame may be quickly and easily converted from use in the wheelbarrow manner to use in the sled manner and vice versa depending upon whether the user has installed the handles in their first generally horizontal orientation on the frame or in their second generally vertical orientation on the frame, respectively; and (h) a cooperable, releasable and resettable lock disposed between the carriage and the frame for retaining the carriage and the at least one exercise weight member carried thereon in a user selected, adjusted position on the frame with the user selected, adjusted position of the carriage remaining fixed relative to the frame during motion of the frame over the support surface in the wheelbarrow manner or the sled manner.

2. The exercise device of claim 1, wherein the at least one wheel is pivotally mounted on the frame and is vertically adjustable relative to the frame to be selectively movable relative to the frame into a plurality of vertically adjusted positions in which the wheel remains in contact with the support surface to adjust the amount of weight carried by the at least one skid when the frame is being used in the sled manner.

3. The exercise device of claim 1, wherein the at least one exercise weight member comprises at least one selectorized dumbbell and a plurality of barbell weight plates.

4. An exercise device, which comprises:

(a) a frame having a front end and a rear end;

(b) two laterally spaced handles carried on the frame adjacent the rear end of the frame in a generally vertical orientation;

(c) at least one support surface engaging wheel carried on the frame adjacent the front end of the frame with the at least one wheel on the front end of the frame being rotatable about a substantially horizontal axis of rotation;

(d) at least one support surface engaging, fore-and-aft extending skid on the frame;

(e) at least one exercise weight member carried on the frame for adding mass to the frame, wherein the at least one exercise weight member is supported on a carriage that is movable in a fore-and-aft direction on the frame towards and away from the at least one front wheel;

(f) wherein the at least one skid remains in contact with the support surface when the user pushes forwardly on the rear handles to slide the frame forwardly over the support surface in the manner of a sled; and (g) a cooperable, releasable and resettable lock disposed between the carriage and the frame for retaining the carriage and the at least one exercise weight member carried thereon in a user selected, adjusted position on the frame with the user selected, adjusted position of the carriage remaining fixed relative to the frame during motion of the frame over the support surface in the sled manner.

5. The exercise device of claim 4, wherein the at least one skid comprises a pair of laterally spaced side skids and a central skid located in a tripod configuration, wherein the side skids are located at one end of the frame and the central skid is located at an opposite end of the frame.

6. The exercise device of claim 5, wherein the one end of the frame is the rear end of the frame and the opposite end of the frame is the front end of the frame.

7. The exercise device of claim 4, wherein the at least one skid comprises a pair of laterally spaced side skids that extend substantially an entire fore-and-aft length of the frame.

8. The exercise device of claim 7, wherein the frame comprises a pair of laterally extending front and rear cross members, wherein a first one of the side skids extends between and is fixed at opposite ends thereof to left sides of the front and rear cross members and a second one of the side skids extends between and is fixed at opposite ends thereof to right sides of the front and rear cross members.

9. The exercise device of claim 8, wherein the rear cross member has a pair of rear handle mounts for releasably mounting the handles to the rear end of the frame in the generally vertical orientation, and wherein the front cross member has a pair of front handle mounts for releasably mounting the handles to the front end of the frame in the generally vertical orientation by removing the handles from the rear handle mounts and by installing the handles in the front handle mounts, thereby permitting use of the frame in the manner of the sled in opposite directions without having to turn the frame around.

10. The exercise device of claim 9, further including at least one support surface engaging wheel carried on the frame adjacent the rear end of the frame with the at least one wheel on the rear end of the frame being rotatable about a substantially horizontal axis of rotation.

* * * * *